United States Patent [19]

Hirsiger

[11] Patent Number: 4,974,304
[45] Date of Patent: Dec. 4, 1990

[54] MOUNTING APPARATUS FOR CNC MACHINE

[75] Inventor: Anton Hirsiger, Tryon, N.C.

[73] Assignee: Sew Eurodrive, Inc., Lyman, S.C.

[21] Appl. No.: 477,321

[22] Filed: Feb. 8, 1990

[51] Int. Cl.$^5$ .......................... B23Q 3/06; B23C 9/00
[52] U.S. Cl. ................................ 29/38 C; 29/33 P; 269/57; 409/221
[58] Field of Search ............... 29/33 P, 563, 57, 38 R, 29/38 C, DIG. 101, DIG. 86; 409/218, 222, 219, 225, 221; 198/465.1, 950, 860.4, 414; 51/272, 268, 270; 414/744, 272, 225; 408/710; 82/122; 269/57, 56

[56] References Cited

U.S. PATENT DOCUMENTS

| | | | |
|---|---|---|---|
| 4,185,376 | 1/1980 | Johnstone | 409/136 X |
| 4,442,739 | 4/1984 | Swanson, Jr. | 82/122 X |
| 4,673,076 | 6/1987 | Mattson | 198/950 X |
| 4,677,718 | 7/1987 | Babel | 29/33 P |
| 4,679,286 | 7/1987 | Momoi et al. | 29/33 P |
| 4,797,989 | 1/1989 | Cherko | 198/465.1 X |
| 4,809,422 | 3/1989 | Kitamura | 29/563 |
| 4,921,378 | 5/1990 | Kytola | 409/221 |

FOREIGN PATENT DOCUMENTS

| | | | |
|---|---|---|---|
| 3431349 | 3/1986 | Fed. Rep. of Germany | 29/563 |
| 173442 | 10/1982 | Japan | 29/38 C |
| 259348 | 12/1985 | Japan | 29/563 |
| 1071396 | 2/1984 | U.S.S.R. | 409/134 |

*Primary Examiner*—William Briggs
*Attorney, Agent, or Firm*—Bailey & Hardaway

[57] ABSTRACT

These as well as other objects are accomplished by an improvement to a computer numerically controlled apparatus wherein there is provided a vertically oriented workholder including means for guiding the workholder into and out of the enclosure of a computer numerically controlled apparatus. The workholder includes means for holding a plurality of shafts in a vertical orientation to permit the plurality of shafts to be machined within the computer numerically controlled apparatus with only one loading and unloading of the apparatus.

6 Claims, 4 Drawing Sheets

MOUNTING APPARATUS FOR CNC MACHINE

BACKGROUND OF THE INVENTION

This invention relates generally to the art of machine tools and more particularly to a workholder for use in a computer numerically controlled apparatus.

Metallic shafts have for a great many years had key ways cut therein so as to facilitate the use of those shafts to transmit rotational forces from one apparatus to another. Traditionally, such apparatus has been utilized for the coupling of an engine to a transmission or a transmission to an apparatus where rotation is required. The machining of these key ways has traditionally been carried out on a horizontal lave under the supervision of a machinist who assures that the key way is cut with precise dimensions. Typically, a machinist will supervise the operation of one or two laves at a time.

In relatively recent history, computer numerically controlled apparatus have come about to replace a machinist for a number of machining operations. These apparatuses include a plurality of working tools and have the ability to change working tools and complete machining operations with the worker having to only load and unload the apparatus. Due to the high speed and precision of the milling machines utilized within a computer numerically controlled apparatus, such apparatuses have been housed in rather complex enclosures so as to contain all metal fragments and lubricating oil provided during the machining operation. Such apparatuses normally have a closure so as to permit placement and removal of a workpiece into the computer numerically controlled apparatus. Due to the expense of computer numerically controlled apparatuses and the complexity of loading and unloading the apparatuses, such apparatuses have normally only been utilized for very complex machining operations.

A number of prior art patents have been directed to milling machines and workholders which are listed here for background information. These patents include U.S. Pat. No. 3,926,421 to Reiger, Jr. et al.; U.S. Pat. No. 4,414,732 to Tomita, et al.; U.S. Pat. No. 4,091,526 to Nakaso, et al.; U.S. Pat. No. 4,185,377 to Nakaso, et al.; U.S. Pat. No. 4,356,621 to Tomita, et al.; U.S. Pat. No. 4,574,441 to Kronfeld; U.S. Pat. No. 4,436,462 to Martinez; U.S. Pat. No. 3,724,964 to Needham, Jr.; U.S. Pat. No. 2,342,829 to Armitage; U.S. Pat. No. 2,387,820 to Armitage, et al.

While a variety of apparatuses exist for milling and machining, there exists a need-to further increase the efficiency of machining operations particularly as related to the use of computer numerically controlled apparatuses.

SUMMARY OF THE INVENTION

It is thus an object of this invention to provide an improved computer numerically controlled machining apparatus.

It is a further and more particular object of this invention to provide a novel workholder for use in a computer numerically controlled apparatus.

It is a further and yet more particular object of this invention to provide such a workholder which holds a plurality of shafts for machining within a computer numerically controlled apparatus.

These as well as other objects are accomplished by an improvement to a computer numerically controlled apparatus wherein there is provided a vertically oriented workholder including means for guiding the workholder into and out of the enclosure of a computer numerically controlled apparatus. The workholder includes means for holding a plurality of shafts in a vertical orientation to permit a plurality of shafts to be machined within the computer numerically controlled apparatus with only one loading and unloading of the apparatus.

DETAILED DESCRIPTION

In accordance with this invention it has been found that shafts may be vertically oriented within a workholder for placement within a computer numerically controlled apparatus such that a plurality of shafts, preferably 8, may be machined upon one opening and closure of a computer numerically controlled apparatus. This is particularly advantageous for the machining of key ways into a plurality of shafts which, before the development of the workholder of this invention, was more efficiently carried out on a plurality of single horizontal laves. Various other advantages and features will become apparent from a reading of the following description given with reference to the various figures and drawings.

Figure 1:
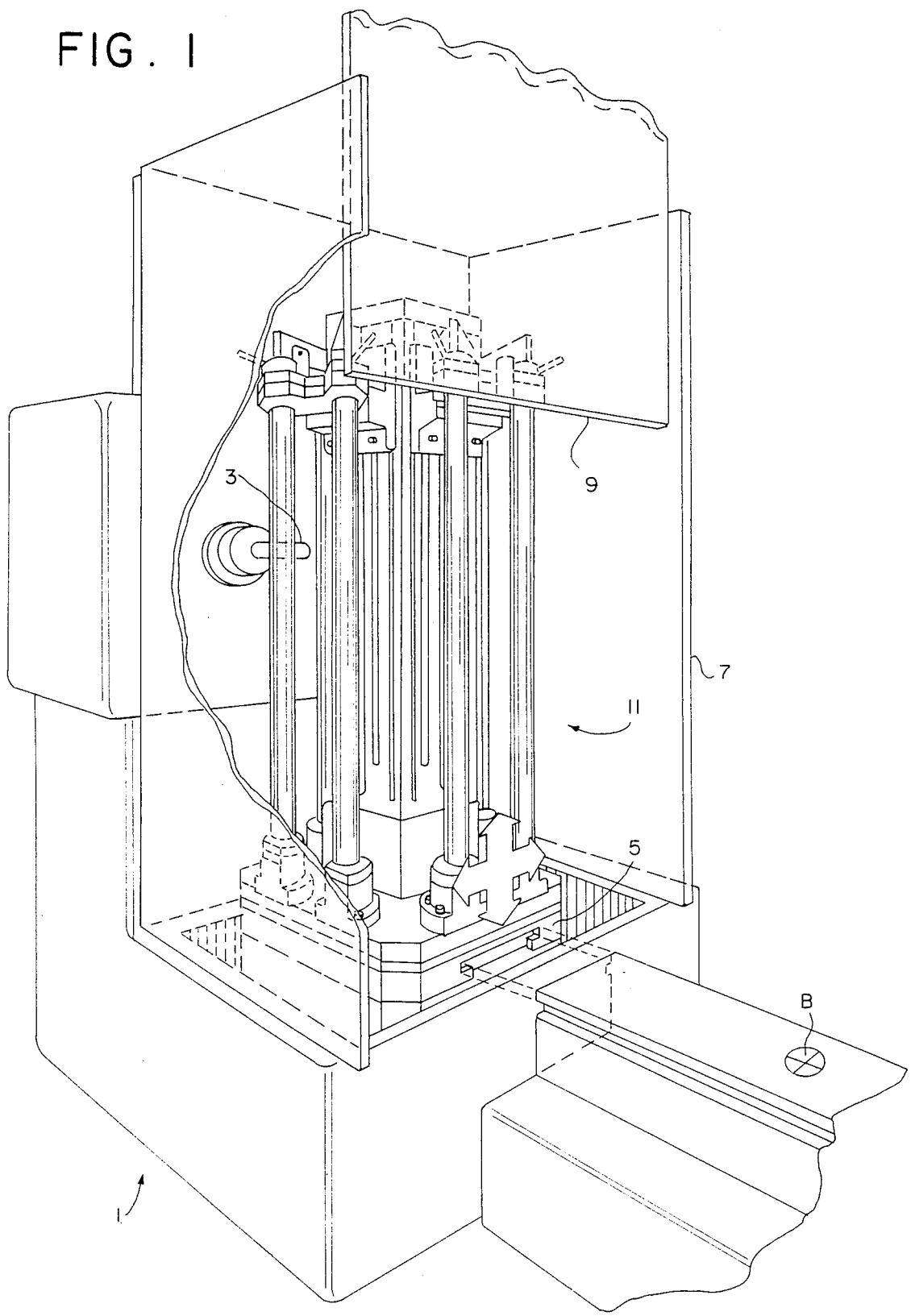
FIG. 1 is a perspective view of a computer numerically controlled apparatus for receiving the workholder in accordance with this invention.

FIG. 1 of the drawings illustrates a computer numerically controlled apparatus 1 having work tools 3 movably mounted therein for precisely orienting and milling a workpiece.

Also located within apparatus is a workholder 5 for precisely orienting a workpiece set in relation to the machine tool 3 and the means for moving and orienting workholder 5 in order to machine a workpiece to precise predetermined dimensions. The computer numerically controlled apparatus 1 includes an enclosure 7 having a closure 9 thereon to permit a workpiece to be mounted on means 5 when the closure 9 is open and to permit closure 9 to be placed in the position to complete the enclosure when machining begins. Due to the excess metal fragments and oil distributed within the enclosure 7 during the machining process closure 9 must always be in the closed position during operation. Normally safety mechanisms are involved to preclude any operation of the computer numerically controlled apparatus 1 if closure 9 is in the open position as illustrated in FIG. 1.

The improvement according to this invention is a vertically oriented workholder 11 which includes means for permitting the workholder 11 to be guided into and out of the computer numerically controlled apparatus and to be engaged by the means for moving and orienting a workpiece 5. The means for guiding are shown here as a rail 13.

Figure 2:
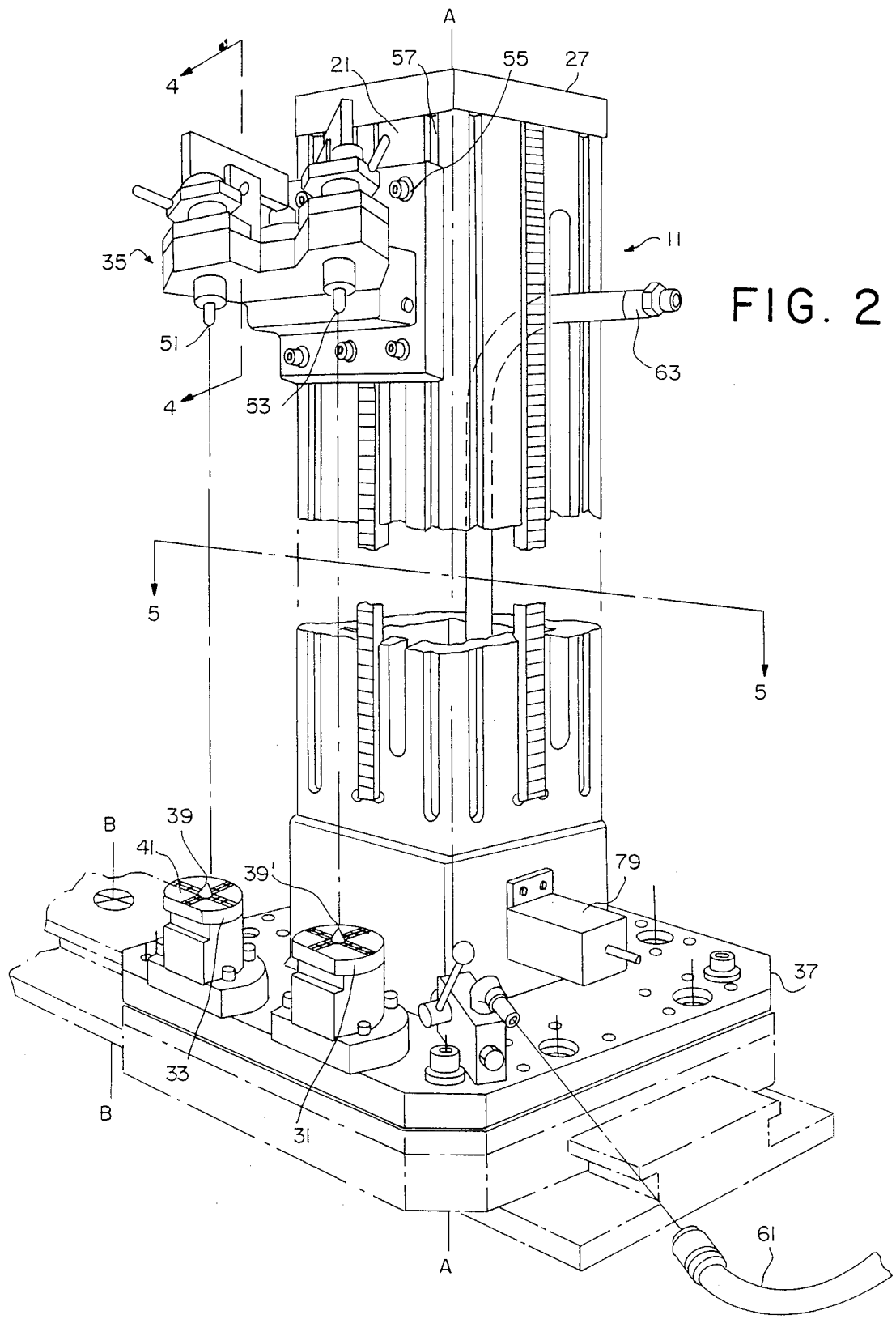
FIG. 2 of the drawings is a perspective view of the workholder in accordance with this invention.

FIG. 2 of the drawings is a partial cutaway isometric view of the vertical workholder 11 in accordance with this invention.

The vertical workholder 11 in FIG. 2 of the drawings. It is seen from viewing FIG. 2 as well as FIG. 3, which is a top view thereof, that the vertical workholder includes four sides 21, 23, 25 and 27.

FIG. 2 is a complete illustration of side 21 with a partial cut away view of side 27. It is understood, however, that all four sides are identical so that eight shafts (not shown) may be held by workholder 11, i.e. two shafts along each of the sides 21 through 27.

Referring again to FIG. 2 and side 21 illustrated therein, each of the sides includes a pair of base members 31 and 33 for supporting a pair of shafts. Located above the base members 31 and 33 is clamping means 35 which clamps a pair of vertical shafts between the clamping means 35 and the base members 31 and 33. Base members 31 and 33 are generally firmly mounted to base 37 of workpiece 11. Each of the base members, 31 and 35 have spring loaded, centering devices 39 and 39' to permit proper location of a shaft about a center indentation of the shaft while permitting the shaft to otherwise rest upon the surface 41 of each of the base members. It has been found critical to this invention that the surface 41 be textured as illustrated at 43, also illustrated in FIG. 5. A cross shaped texturing is preferred.

Preferably hydraulic means to be further described are operable to operate clamping means 35 so as to engage a shaft between the clamping means 35 and base members 31 and 33 which thus render the shafts nonrotatable because of the texturing shown at of 43 on the surface 41.

Upon initial loading of the workholder 11, shafts are placed upon centering means 39 and 39' and clamping means 35 are moved into engagement with a center indentation of a shaft with top centering means 51 and 53. Clamping means 35 is initially manually moved into place by loosening of a bolt 55 which is connected to a typical t-nut which rides within the slot 57 defined in the vertical surface 21. After manually placing shafts into position and moving clamping means 35 and into operational position and tightening of bolt 55 and its counterparts, hydraulic means operate to further clamp shafts into an immovable position. As illustrated in FIG. 2, a source of hydraulic fluid 61 connects to the workholder 11 so as to supply clamping means 35 and its counterpart surface with hydraulic fluid. Illustrated in FIG. 2 with clamping means removed from surface 27 is a hydraulic hose 63 which would operate upon a clamping means located about surface 27.

Figure 4:
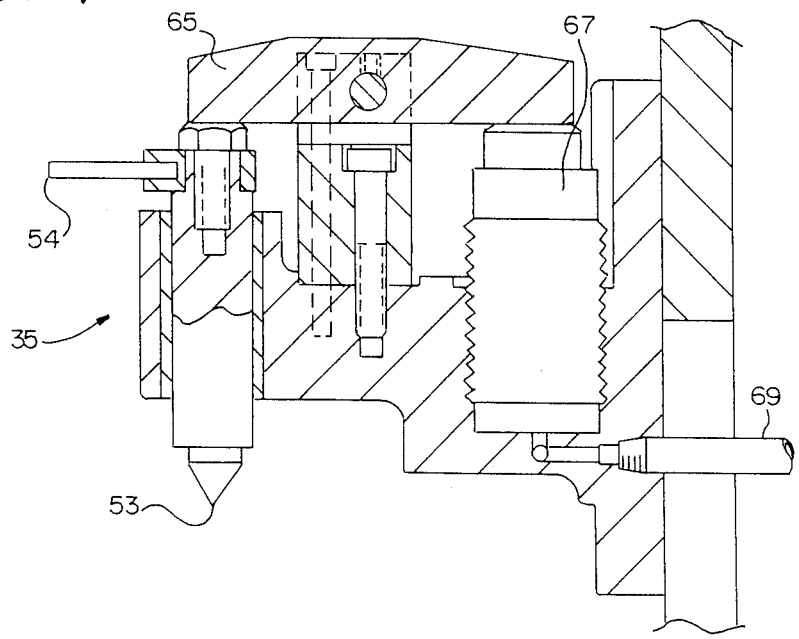
FIG. 4 is a cross sectional view along line 4—4 of FIG. 2.

FIG. 4 of the drawings is a partial cut away view along the line 4—4 of FIG. 2 which illustrates further the operation of clamping means 35. As illustrated therein, the top centering means 53 includes manual adjustment means 54 and a rocker arm 65 which is operable from a hydraulic cylinder 67 receiving a source of hydraulic fluid through 69 similar to 63 illustrated in FIG. 2.

Figure 3:
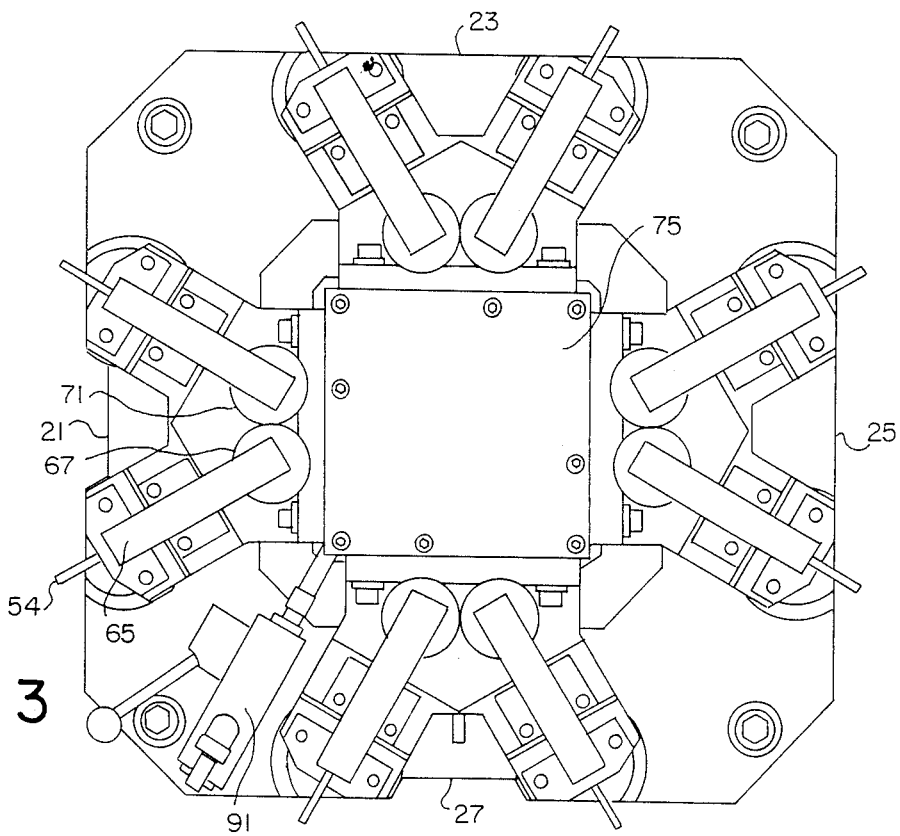
FIG. 3 is a plan view of the apparatus shown in FIG. 2.

Thus the piping mechanism 35 includes three means for movement, manual movement through t-bolts 55, manual left handle 54, and hydraulically rocker arms 65. Each of the clamping mechanisms 35 include separate hydraulic cylinders as best illustrated in the top view of FIG. 3. Thus in FIG. 3, in association with side 21 there is shown hydraulic cylinder 67 and its companion 71. Unnumbered but also illustrated are similar rocker arm cylinder arrangement along sides 23, 25 and 27. Also illustrated in FIG. 3 is a top cover 75 for the upper portion of workholder 11.

Figure 5:
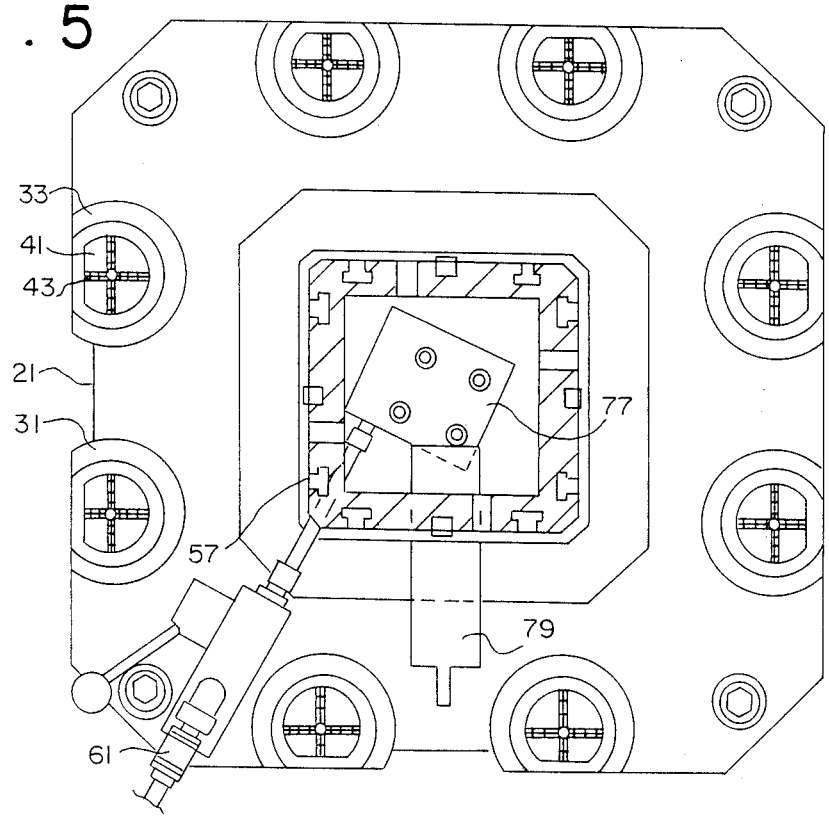
FIG. 5 is a crossectional view along line 5—5 of FIG. 2 of the apparatus in accordance with this invention.

Illustrated in FIG. 5 is an inside view below cover 75 showing hydraulic column 77, supply hose 61, a pressure gage 79 as well as the plurality of base members illustrated here as 31 and 33 along side 21.

T-slot clamp 57 and its counterparts are also illustrated.

It is thus seen that once a plurality of shafts are loaded the entire workholder 11 is placed into apparatus wherein each individual shaft is machined according to predetermined parameters. The apparatus of this invention is ideally suited for the machining of key ways in such shafts but it is understood that other machining operations as well may be performed. Upon completion of the machining operation, enclosure 9 is opened and workholder 11 is moved out of apparatus 1 by guide means 13. Upon reaching an unloading stage, a quick hydraulic disconnect 91 is illustrated in the top view of FIG. 3. This permits a quick relief of hydraulic pressure so as to permit unloading of the machine workpieces.

Figure 6:
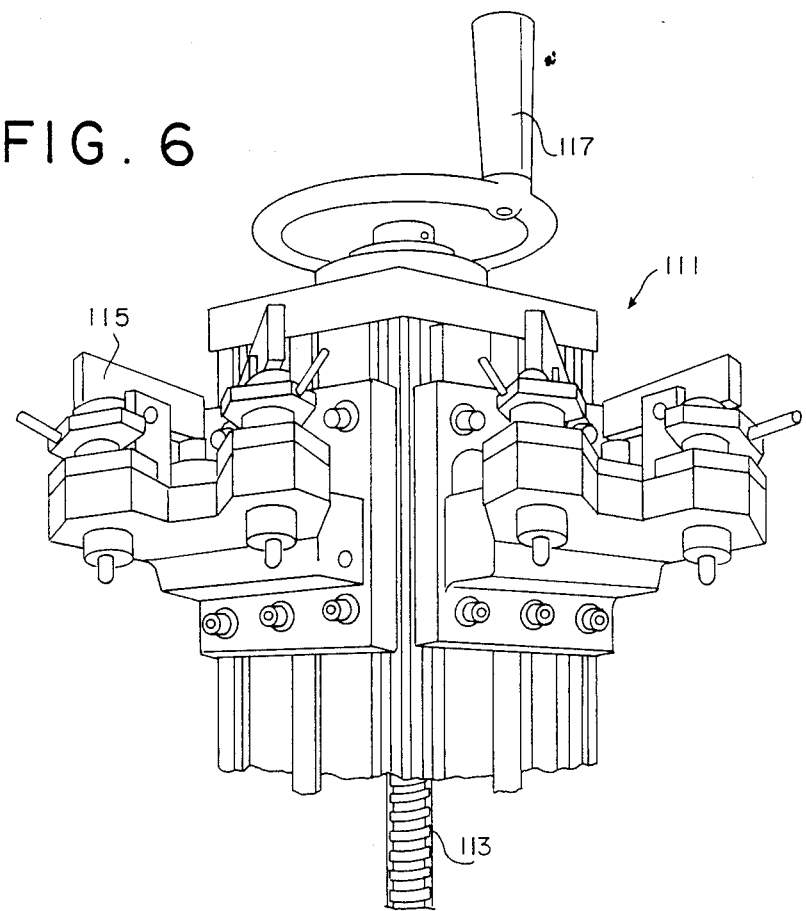
FIG. 6 is a perspective partial view of yet another embodiment of this invention.

FIG. 6 illustrates another embodiment of this invention wherein a vertical workholder 111 is virtually identical in every respect to workholder 11 with the exception that hydraulic means are not included. In this view, clamping pressure is applied by screw 113 exerting pressure on rocker arms 115 when manual force is applied through manual wheel 117. Of course, it is understood that other types of force may be applied to exert clamping pressure on shafts mounted within the workholder 11.

It is thus seen that the apparatus of this invention provides an improved computer numerically controlled apparatus which includes a workholder for holding a plurality of shafts for machining within a computer numerically controlled apparatus. As various modifications will become apparent to those of skill in the art from a reading of the foregoing description which is exemplary in nature, such modifications are embodied within the spirit and scope of this invention as defined by the following appended claims.

That which is claimed is:

1. In a computer numerically controlled apparatus for machining a workpiece within a confined enclosure, said apparatus including a closure to permit placement and removal of the workpiece within the enclosure, means for moving and orienting said workpiece and means for moving and orienting a machine tool to precisely machine a workpiece to predetermined dimensions, the improvement comprising;

a vertically oriented workholder;
 means for guiding said workpiece through said closure and thus into and out of said enclosure;
 said workholder including means for holding a plurality of shafts in vertical orientation said workholder having vertical sides each having a pair of base members for centering and supporting a shaft and clamping means movably mounted above said base members for clamping said shafts into a vertical orientation, whereby said workholder may be moved into said enclosure for engagement with said means for moving and orienting, whereby each of said plurality of shafts may be machined by said machine tool.

2. The improvement according to claim 1 wherein said vertically oriented workholder has four vertical sides each including a pair of base members for centering and supporting a pair of said shafts.

3. The apparatus according to claim 2 wherein said base members are textured to engage a shaft and prevent rotation thereof relative to the member.

4. The apparatus according to claim 2 including hydraulic means for moving said clamping means into clamping engagement with said pair of shafts.

5. The apparatus according claim 2 further including screw means for moving said clamping means into clamping engagement with said pair of shafts.

6. A process for machining key ways in metallic shafts comprising the steps of:
providing,
 a vertically oriented workholder,
 means for guiding said workholder into a computer numerically controlled machining apparatus, said workholder, including means for holding a plurality of shafts in a vertical orientation;

vertically orienting a plurality of said shafts within said workholder;

clamping said vertically oriented shafts within said workholder;

moving said workholder into the enclosure of a computer numerically controlled machining apparatus;

closing said computer numerically controlled apparatus to form an enclosure about said vertically oriented workholder;

machining each of said vertically oriented shafts within said workholder;

opening the enclosure of said computer numerically controlled machining apparatus; and removing said workholder from said computer numerically controlled apparatus.

* * * * *